L. B. WYGANT.
TIE WELDING BALING PRESS.
APPLICATION FILED FEB. 6, 1915.
1,232,643.
Patented July 10, 1917.
4 SHEETS—SHEET 1.
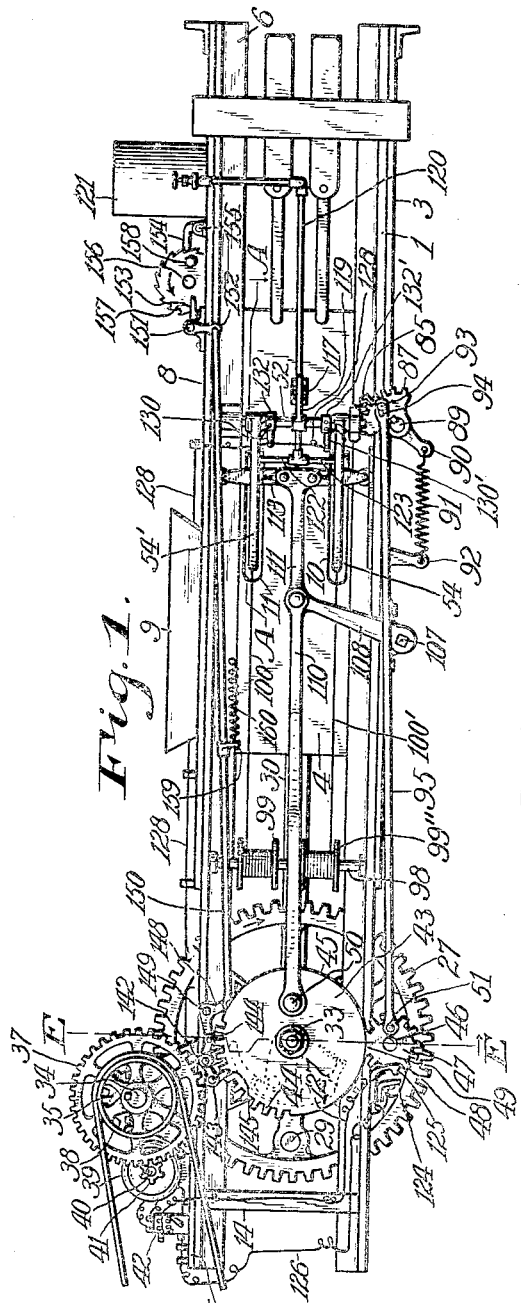
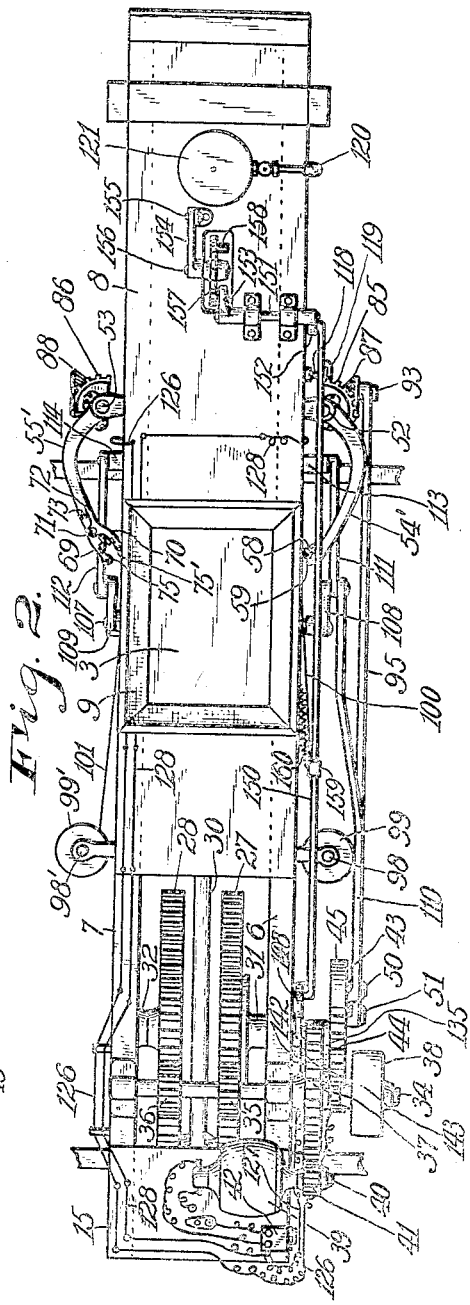
WITNESSES:
J. H. Gardner.
M. E. Sparrow.
INVENTOR:
Lewis B. Wygant,
BY
E. T. Silvius,
ATTORNEY.

L. B. WYGANT.
TIE WELDING BALING PRESS.
APPLICATION FILED FEB. 6, 1915.
1,232,643.
Patented July 10, 1917.
4 SHEETS—SHEET 2.
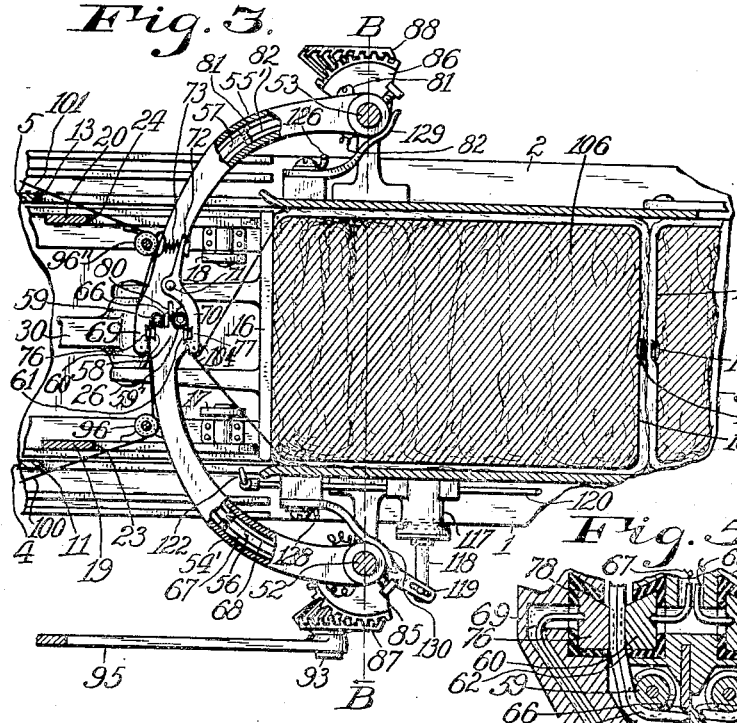
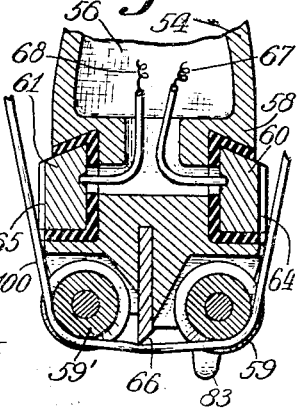
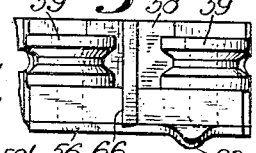
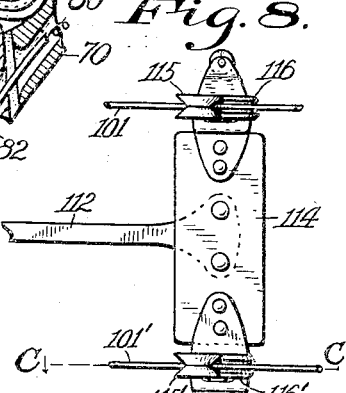
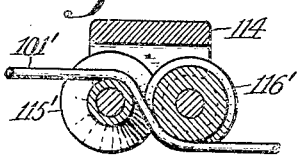
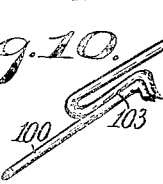
WITNESSES:
J. H. Gardner
M. E. Sparrow
INVENTOR:
Lewis B. Wygant,
BY
E. T. Silvius,
ATTORNEY.

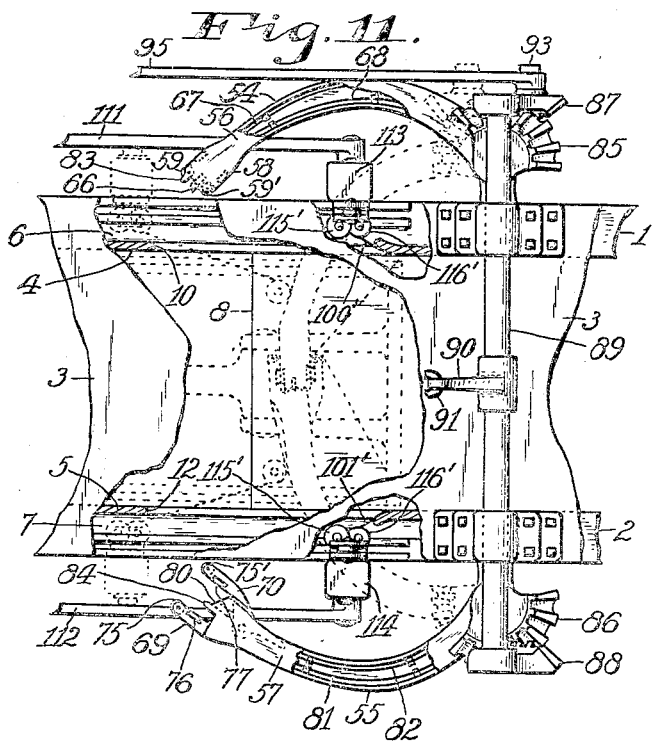
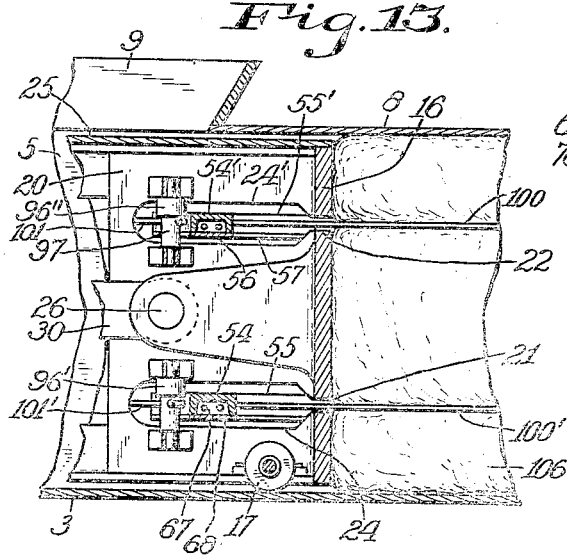
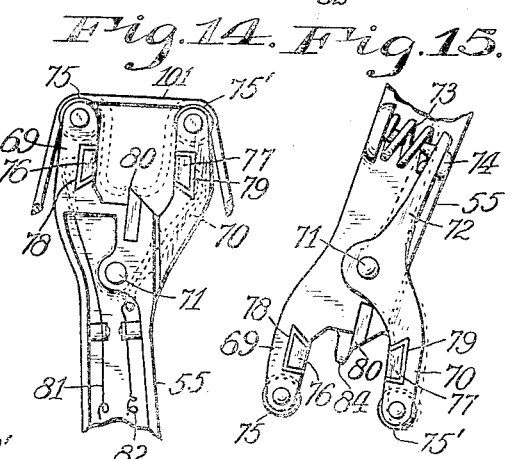
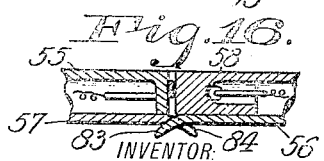

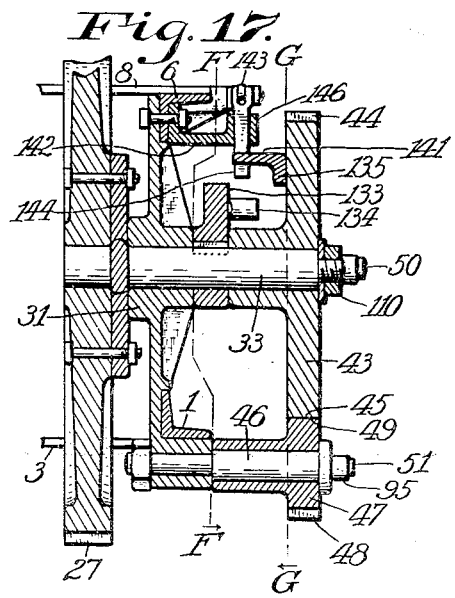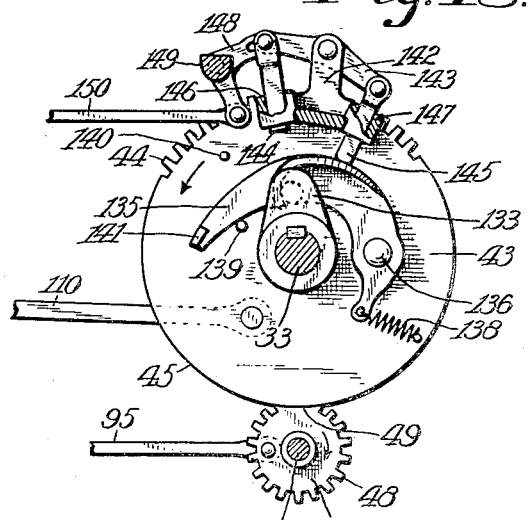

UNITED STATES PATENT OFFICE.

LEWIS B. WYGANT, OF VINCENNES, INDIANA.

TIE-WELDING BALING-PRESS.

1,232,643.  Specification of Letters Patent.  Patented July 10, 1917.

Application filed February 6, 1915. Serial No. 6,412.

*To all whom it may concern:*

Be it known that I, LEWIS B. WYGANT, a citizen of the United States, residing at Vincennes, in the county of Knox and State of Indiana, have invented a new and useful Tie-Welding Baling-Press, of which the following is a specification, reference being had to the accompanying drawings and to the letters and figures of reference marked thereon.

This invention relates to means for forming bales of hay or other substance, and has reference more particularly to a baling press provided with means for forming a substantially continuous band or bale tie designed to securely hold the substance together in the form of a bale.

An object of the invention is to provide an improved band for bales that shall be continuous without requiring the use of the objectionable wire-connecting devices or unreliable twisting of cold wires for completing the band or tying devices.

Another object of the invention is to provide an improved baling press of such construction as to be enabled to bind a substance by means of continuous metallic bands, and in an expeditious and reliable manner.

A further object is to provide means in baling presses of such construction as to operate automatically for electrically welding tie wires so as to form continuous bands on bales of substance, and which shall be reliable and simple in construction and capable of forming the bale ties or bands inexpensively.

A still further object is to provide a complete portable baling press having electrical welding apparatus and means for producing electric current, to the end that the baling operations may be accomplished in various localities where required and which shall be durable and economical in use.

With the above-mentioned and other objects in view the invention consists in a machine constructed for packing substances into the form of bales, the machine being provided with appliances for drawing wires about the packed substance and controlling the wires to be welded, and means for automatically welding and electrically uniting the wires when brought about the bale, and a source of electricity which preferably is carried on the machine. The invention consists also further in the novel parts, and in the combinations and arrangements of parts, as hereinafter particularly described and further set forth in the accompanying claims.

Referring to the drawings,—Figure 1 is a side elevation of a baling press constructed substantially in accordance with the invention; Fig. 2 is a top plan of the machine; Fig. 3 is a fragmentary section approximately on the line A A on Fig. 1 with a bale in the process of formation in the machine; Fig. 4 is a fragmentary horizontal section of one of the carriers comprised in the invention for accomplishing the welding operations; Fig. 5 is a fragmentary horizontal section showing the relative arrangement of the two carriers when welding of the baling wire is being effected; Fig. 6 is a front or end view of the device shown in Fig. 4; Fig. 7 is a fragmentary transverse section on the plane of the line B B on Fig. 3; Fig. 8 is an elevation of a cross-head having sheaves thereon for guiding the baling wire; Fig. 9 is a section on the line C C on Fig. 8; Fig. 10 is a fragmentary view of two portions of a wire or two wires electrically welded together for completing a baling band; Fig. 11 is a fragmentary inverted plan partially broken away; Fig. 12 is an inverted plan of one of the carriers; Fig. 13 is a fragmentary section on the plane of the line D D on Fig. 7; Fig. 14 is an inverted plan of the remaining one of the two carriers preferably employed in construction; Fig. 15 is a top plan of the device shown in the preceding figure; Fig. 16 is a fragmentary section illustrating devices for bringing the carriers into alinement; Fig. 17 is a fragmentary section approximately on the line E E on Fig. 1; Fig. 18 is a section on the line F F on the preceding figure; Fig. 19 is a fragmentary top plan of the two carriers brought together nearly into operative position for holding and welding the tie wires; Fig. 20 is a section on the line G G on Fig. 17; Fig. 21 is a top plan of one of the parts of the machine; and, Fig. 22 is a perspective view of another one of the parts of the machine.

Similar reference characters on the different figures of the drawings indicate corresponding elements or features of construction herein described.

The frame or body part of the baling press may be varied as to details, a common form of structure being shown for the purpose of clearly describing the invention and comprising L-section bottom rails 1 and 2, a bottom or floor plate 3 secured to the rails, side plates 4 and 5 on the rails respectively, top rails 6 and 7 upon the side plates respectively, and a top or roof plate 8 secured upon the top rails, so as to constitute a compression or baling chamber provided with a hopper 9 as usual through which the substance to be baled is to be fed either by hand or otherwise as may be desired. The side plate 4 has slots 10 and 11 therein, the opposite plate of the baling chamber having similar slots 12 and 13 therein. The frame comprises also a suitable number of upright side bars 14 connected to the bottom and top rails, and a top plate 15 upon the forward portions of the top rails.

A ram head 16 is provided for packing the hay or other substance in the compression chamber and is provided in its lower portion with a suitable number of carrying rollers 17, 18, that are supported upon the bottom plate 3, the ram head having side plates 19 and 20 that are guided by the walls of the compression chamber. The front of the ram head has horizontal slots 21 and 22 therein for the passage of baling wires and from which slots 23 extend in one side plate of the head and similar slots 24, 24', in the opposite side plate of the head on horizontal planes coinciding with the planes of the slots in the side plates 4 and 5. The ram head, as will be seen, is of open-work formation but has a top plate 25 that prevents the entrance of hay or other substance into the ram head when the latter is under the hopper. The ram head is suitably provided with a horizontal wrist pin 26 for actuation and control of the head by means of two gear wheels 27 and 28 that are rotatably mounted in the main frame and to which a crank pin 29 is connected, a pitman 30 being connected to the crank pin and also to the wrist pin 26. The frame is provided with suitable bearings 31 and 32 that respectively support the gear wheels, the wheel 27 having a supporting shaft 33 fixed thereon that is rotatably mounted in the bearing 31. A driving shaft 34 is rotatably mounted on the frame above the gear wheels and has two pinions 35 and 36 fixedly secured thereto in mesh with the gear wheels 27 and 28 respectively. A relatively larger wheel 37 is secured also to the driving shaft, the shaft being provided with a pulley 38 whereby to drive the machinery by means of a belt. A suitable electrical generator 39 is mounted upon the top plate 15 and has a shaft 40 to which is secured a relatively small wheel 41 adapted to be driven by the wheel 37 at relatively high speed. A suitable device 42, such as a rheostat or controller, is arranged conveniently to the generator and suitably connected or adapted to be connected therewith for the purpose of enabling the operator to obtain and control an electric current of the proper character for welding purposes, more especially in localities where electric current cannot otherwise be conveniently obtained. Intermittent motion rotary gearing is provided for a purpose which will hereinafter appear and comprises a wheel 43 that is rotatably mounted on the shaft 33 and has a segment of its periphery provided with gear teeth 44, the remainder of the periphery of the wheel being made true to constitute a guide 45. A stub-shaft 46 is supported below the shaft 33 and has a segmental pinion 47 rotatably supported thereon, the pinion having gear teeth 48 conforming to the teeth 44 and having also a concave guide portion 49 devoid of teeth and fitted to contact with the guide 45, so that the wheel 43 may partially rotate and prevent the pinion 47 from rotating, the pinion being rotated one revolution by the teeth 44 engaging the teeth 48. The wheel 43 is provided on its outer side with a crank pin 50, and the pinion 47 is provided with a crank pin 51.

An important feature of the invention comprises means for bringing portions of baling wire together and holding them under control, and means for automatically welding and electrically uniting the portions together to produce the baling band. The structure comprises suitable means whereby to bring electrical terminals or electrodes into juxtaposition and to also control tie wires and momentarily hold them in position between the terminals or electrodes for the purpose of forming an integrally continuous baling band by welding portions of the wires together. Preferably two carriers adapted to control and hold wire portions are provided, and in order that they may operate in relatively small space the carriers preferably are each made in the form of a curved arm. For supporting the arms two shafts 52 and 53 are rotatably mounted in vertical arrangement on opposite sides respectively of the main frame adjacent to the outer sides of the baling or compression chamber of the machine. Two carrier-arms 54 and 54' are fixedly secured to the shaft 52 and in such position as to permit them to be moved into the slots 10 and 11 respectively, two other carrier-arms 55 and 55' being fixedly secured to the shaft 53 so as to be permitted to be swung into the slots in the opposite wall of the compression chamber, two pairs of carriers thus being provided in order that each bale may be provided with two bands which usually are desired. Preferably each carrier-arm is channeled in its under side and the two of the pair provided with bottom plates 56 and 57 respectively to cover the channel and form an inclosure. The end of one carrier of each pair has a head 58 thereon that is provided with two grooved rollers or guide sheaves 59 and 59' for guiding wire around the front and the sides of the head. The two opposite vertical sides of the head have blocks 60 and 61 therein provided with insulation 62 and 63 respectively, the blocks being preferably composed of copper to constitute electric terminals or electrodes, the outer sides of the blocks preferably having horizontally extending grooves 64 and 65 therein respectively to receive and assist in drawing the baling wires together. The front of the head is provided with a shear blade 66 that projects slightly beyond the head. Two electric circuit wires 67 and 68 are connected to the blocks 60 and 61 respectively and are suitably supported in the channel of the arm, the wires extending back into proximity to the supporting shaft of the arm. The companion carrier-arm of each pair as preferably constructed has a jaw member 69 projecting from its end and also a yielding jaw member 70 that is connected to the carrier-arm by means of a pivot 71, the member extending substantially parallel to the member 69 and having a tail piece 72 that is engaged by a spring 73 and normally pressed against a stop projection 74 of the carrier-arm, the spring being suitably supported on the carrier-arm, so that the member 70 may be forced slightly away from the member 69, the two members comprising a welding jaw in which the welding head 58 is received in operation. The end of the member 69 is provided with a grooved roller or guide sheave 75, the member 70 being likewise provided with a similar device 75'. The inner sides of the members 69 and 70 are provided with electrical terminal blocks or electrodes 76 and 77 provided with insulation 78 and 79, respectively. The carrier 55 is provided with a shear blade 80 constructed and arranged so as to coöperate with the blade 66 for severing the baling wires when the wires are welded together, so as to disconnect a completed baling band from the remainder of the baling wires. Two electrical circuit wires 81 and 82 are connected to the blocks 76 and 77 respectively and extend along the channel of the carrier approximately to the supporting shaft of the carrier. In order to insure correct alinement of the ends of the carriers one is preferably provided with a downwardly curved finger 83 on its under side, and the other with a finger 84 formed so that when the welding head is received between the welding jaws the fingers engage the oppositely approaching carrier and bring the ends of the two carriers to one and the same horizontal plane. It will be understood that the ends of the arms may be variously guided if desired. The conducting wires that are carried by the carrier arms may be variously connected with wires to complete electrical circuits.

For the purpose of synchronously operating the carriers the shafts 52 and 53 are provided respectively with relatively fixed gear segments 85 and 86 that are in mesh with gear segments 87 and 88 respectively, the latter being fixedly secured to a rock-shaft 89 which is horizontally mounted on the under side of the main frame and below the shafts 52 and 53. Preferably an arm 90 is fixedly secured to the rock-shaft 89 and connected to a spring 91 which is connected to a device 92 that is supported by the under side of the main frame for automatically drawing, or assisting to draw, the carriers or welder arms from the compression chamber. The gear segment 87 is provided with a rocker pin 93 that is received in a longitudinal slot 94 formed in a connecting rod 95 that is connected to the crank pin 51. When the pinion 47 is rotated one-half revolution, the carrier arms are swung into connection in the compression chamber, and on further rotation of the pinion the connecting rod 95 moves slightly while the welder heads and jaws are at rest before retracting the carrier-arms. The duration of the rest period while the welding action occurs may be varied and differ under different conditions, and therefore the slot 94 may be varied in length and in some cases may not be required to be more than a mere hole to receive the rocker pin.

In order to assist the controlling mechanism of the carriers and insure correct connection of the welder head and the welder jaws, a suitable number of rollers 96, 96', 96'', are mounted on the inner sides of the side plates of the ram-head in vertical arrangement and opposite the slots in the plates. When the carrier-arms are moved into the advancing ram-head the rollers are brought into contact with the outer sides of the carrier-arms, the curved faces of the carrier-arms then being inclined or oblique to the plane of travel of the ram-head act as cams against the rollers to force the two carrier-arms each to the other. Each roller has a relatively small lower portion 97 for guiding a baling wire between the roller and the contacting carrier-arm.

Two shafts 98 and 98' are suitably supported on opposite sides respectively of the main frame and support two spools 99 and 99' respectively and also other similar spools 99'', so that there are upper and lower pairs of spools corresponding in numbers to the pairs of carriers. The upper spools hold baling wires 100 and 101 respectively, the lower spools holding similar wires 100' and 101'. The wires on one side of the machine are drawn through the slots in one wall of the baling chamber, the remaining wires being drawn in through the slots in the opposite wall of the chamber and are formed into bands 102, each band having a welded portion 103 adjacent to which another band portion 104 is formed and has a welded portion 105. The incomplete bands are shaped by the substance that is packed into the form of a bale 106 in the baling chamber.

The baling wires are suitably guided adjacent to the slots in the side walls or plates of the compression chamber so that the guide sheaves mounted on the carriers shall certainly engage the wires to draw them together when the carriers are moved into the chamber, and preferably the wire-guides are shiftable and constructed to perform the functions of tension devices for preventing slackening of the wires when being drawn together about the bales. For this purpose a rock-shaft 107 is mounted transversely under the baling chamber and has two arms 108 and 109 fixed thereon that extend upward on opposite sides respectively of the chamber, a connecting rod 110 being connected to one of the arms and also to the crank pin 50. The rock-shaft, as will be seen, is operated only with the intermittent movement of the wheel 43. Two reach-rods 111 and 112 are connected with the arms 108 and 109, respectively, and comprise relatively fixed portions or cross-heads 113 and 114 respectively that are suitably guided by the main frame on the outer sides of the baling chamber. The upper portion of each cross-head supports two grooved rolls 115 and 116 between which one of the upper wires extends, the lower portion of the cross-head supporting similar rolls 115' and 116' between which one of the lower wires extends.

In some cases a pump cylinder 117 suitably constructed is mounted on one side of the machine and has a plunger or piston rod 118 that is connected with an arm 119 secured to the shaft 52. The pump cylinder is provided with a supply pipe 120 that is connected with a reservoir 121 mounted on the machine. The cylinder is provided also with a discharge pipe 122 that terminates with an open end in one of the slots in the side wall of the baling chamber, the pipe having a branch 123 that leads to the other slot for delivering jets or sprays of water into the hollow ram-head if required after welding operations in case ignition of dust, chaff, or other substance occurs.

For the purpose of causing electrical welding to be accomplished at the proper periods, suitable provision is made for making or breaking the required electrical circuit and may suitably comprise a contact finger 124 suitably supported by the main frame in proximity to the pinion 47 and a spring finger 125 supported near the other finger and so as to be engaged by the end of the rod 95 when the crank pin 51 is carried rearward beyond the shaft of the pinion at the moment when the baling wires are held in the welding implement. A circuit wire 126 is connected with the finger 124 and extends to the circuit wires that are carried by the carrier arms on one side of the machine. A circuit wire 127 is connected with the spring finger 125, so that the circuit is closed when the spring finger is pushed into contact with the finger 124. The circuit breaker, however, may be variously constructed and arranged so as to close the circuit at the required periods. The wire 127 is connected with the rheostat or device 42, from which extends a circuit wire 128 to the wires that are carried on the carrier-arms on the opposite side of the machine, suitable slip-connections for the wires preferably being provided so as to permit swinging of the wires on the carrier arms relatively to the wires that are stationary on the main frame without bending the wires. To this end the wire 126 is connected to two spring fingers 129 and 129' that are suitably supported on the side plate 5 of the baling chamber, the wire 128 being connected to two fingers 130 and 130' mounted on the opposite plate 4. Two collars 131 and 131', which are electrical conductors, are fixedly secured on the shaft 53 and insulated therefrom and are in contact with the fingers 129 and 129' respectively, the collars being arranged in proximity to the arms on the shaft. Similar collars 132 and 132' are mounted on the shaft 52 in contact with the fingers 130 and 130', respectively. The wires on each carrier-arm are connected to the adjacent collar, so that electrical connection is constantly made between the movable and the stationary wires.

For the purpose of causing and controlling intermittent movement of the various elements required after the formation of each bale by constant reciprocatory operation of the ram-head, a crank arm 133 is fixedly secured to the rotatable shaft 33 and is provided with a lateral pin 134. A curved pull-bar 135 is connected by means of a pivot 136 to the wheel 43 and extends partially about the shaft 33, one side of the pull-bar being provided with a projecting lug 137 which is carried into the path of movement of the pin 134 by means of a spring 138 mounted on the adjacent wheel and suitably connected with the pull-bar, the latter preferably being limited in its swinging movement between stop-pins 139 and 140 secured to the wheel. The free end portion of the pull-bar has a lateral finger 141 thereon, as preferably constructed. A suitable bracket 142 is fixedly secured to the main frame in proximity to the wheel 43. A tumbling-arm 143 is pivotally supported between its ends on the bracket and has two stop-bars 144 and 145 connected with opposite ends thereof respectively, the stop-bars being slidingly guided in guideways 146 and 147, respectively, with which the bracket is provided. The stop-bars are projectable toward or from the shaft 33, and when either one of the stop-bars is projected and the wheel 43 is rotated the finger 141 is carried into contact with the stop-bar and slides outward so as to carry the lug 137 away from the pin 134, thus stopping movement of the wheel while the shaft 33 may continue to rotate. A bell-crank lever 148 is pivotally mounted on a support 149 fixed in proximity to the bracket 142, one arm of the bell-crank being connected with the tumbling-arm 143. A connecting rod 150 is connected to the remaining arm of the bell-crank and extends along one side of the main frame and beyond the carrier-arm. A rock-shaft 151 is mounted upon the top of the main frame and has a crank arm 152 that is connected to the rod 150, the rock-shaft having also a trip-arm 153. An arm 154 is connected to a pivot 155 suitably supported upon the top of the main frame, the arm being provided with a shaft 156 on which a toothed wheel 157 is mounted and provided with a trip-pin 158. The wheel 157 operates in a suitable opening in the top plate 8 so as to ride upon and be rotated by the bales on their passage through the baling chamber. When the wheel 157 is rotated, the trip-pin is carried into contact with and operates the trip-arm 153 so that the rod 150 is moved in one direction, and in order to retract the rod it is provided with a lug 159 to which a spring 160 is connected, the latter being suitably connected to the main frame.

It is to be understood that the usual or obvious expedients will be resorted to by the electrician in arranging and supporting the electrical circuit wires pertaining to the welding system, and will provide insulation for the electrical circuit wherever found necessary. Also the proper adjustments will be made for attaining the highest efficiency in the welding operations; the thickness and character of the baling wire, the space between the welder jaws, the spaces between the electrodes, and the depth of the grooves in the electrodes being taken into consideration. It should be understood also that various modifications of the various elements or structural details are contemplated and may be made within the scope of the accompanying claims, the structure herein fully described being intended to explain rather the preferred form of construction for most efficiently and conveniently carrying out the objects and purposes of the invention.

In practical use power is suitably applied to drive the shaft 34 from which the connected gearing and the electrical generator are operated while the substance to be baled is fed by any desired means into the hopper 9, the substance entering the baling or compression chamber when the ram-head is retracted, the repeated forward movement of the ram-head causing the substance to be packed into the chamber in wire loops previously formed of the baling wires, while the carrier arms remain at rest because of the locking of the wheel 43 by means of the pull-bar 135 in contact with the stop-bar 144. The wheel 157, being of proper diameter, is turned one revolution while the proper amount of substance is packed to form a bale and then operates the trip-arm 153 so as to withdraw the stop-bar and permit the spring 138 to swing the pull-bar toward the shaft 33 so that the lug 137 shall be engaged by the pin 134 as it is carried around by the crank arm 133, the result being that the wheel 43 is rotated one revolution and causes the pinion 47 to be turned one revolution, resulting as herein-before explained in the swinging of the carrier-arms into the chamber and ram-head while the ram-head is advanced and holding the substance under compression, the carrier-arms as they move inward being brought into contact with the baling wires and carrying them each to the other so that the wires are brought together under control approximately as shown in Fig. 19, and finally as illustrated in Fig. 5 when the wires are at rest side by side and are severed while the electrical circuit has been automatically established and the electrical current passes through the wires from one to the adjacent one of the welder blocks or electrodes, the electrical resistance of the baling wires producing sufficient heat in the wires to cause fusion and welding of the wires, thus completing a band around each successive bale that is formed and also partially forming a loop which is cut off from the band to receive the substance for forming the next succeeding bale. When the stop-bar 144 is withdrawn to release the pull-bar 135 the latter is swung inward while the stop-bar 145 is projected as an emergency stop to be engaged by the finger 141 when carried around, in case the connections are tardy in projecting the stop-bar 144 into the path of movement of the finger. Continuous operation of the machine results in the production of bales in succession, which are automatically formed and bound by integrally continuous bands and delivered from the machine while the substance is fed into the baling chamber. Various movements and results thereof of the various parts of the machine will be readily understood on reference to the description of the construction and function thereof without further explanation.

Various features of the invention shown and described, but which may not be claimed in this application, form subject-matter of my co-pending application for Letters Patent filed April 10, 1916, Serial Number 90,098.

Having thus described the invention, what is claimed as new is—

1. A tie-welding baling press including a baling chamber, and means comprising supported electrical welder heads adapted to draw wire portions together and hold the portions side by side, each welder head having an electrical circuit leading thereto and a shear blade insulated from the circuit, for electrically uniting a bale-tie in the baling chamber.

2. A tie-welding baling press including a baling chamber, means comprising two electrical welder heads, one of the heads having two guide sheaves thereon and also a shear blade arranged between the two sheaves, the remaining one of the heads having also a shear blade, means for supporting the heads, and two electrical circuits leading respectively to the two heads, for electrically uniting a bale-tie in the baling chamber.

3. A tie-welding baling press including a baling chamber, a plurality of movable electrical welder heads adapted to clamp two wire portions together in parallel arrangement, each head having a shear blade to coöperate with the other to sever the clamped wire portions and having also an electrical circuit insulated from the shear blade, and means adapted to support and forcibly move the welder heads to clamp the wire portions, for electrically uniting a bale-tie in the baling chamber.

4. A tie-welding baling press including a baling chamber, a plurality of electrical welder heads supported on opposite sides respectively of the chamber and adapted to coöperate to clamp two wire portions together in parallel arrangement, each head having a groove to receive the wire portion and also a guide for the wire portion, and shear blades mounted in the welder heads and adapted to coöperate to sever the wire portions where they are clamped.

5. A tie-welding baling press including a baling chamber, a plurality of electrical welder heads supported to be moved into the baling chamber and adapted to guide and clamp two wire portions together in parallel arrangement in the chamber, means for moving and controlling the heads, shear blades carried by the heads respectively and operated thereby to sever the wire portions, and electrical means carried by the welder heads and coöperating to weld the wire portions together.

6. A tie-welding baling press including a baling chamber, welder heads supported adjacent to the chamber and adapted to clamp two wire portions together, means for controlling the heads, shear blades carried by the heads respectively and controlled thereby to sever the clamped wire portions, and electrical means carried by the welder heads and coöperating to weld the wire portions together.

7. A tie-welding baling press including a baling chamber, two carrier-arms supported on the opposite outer sides respectively of the chamber to be moved into the chamber, each carrier-arm having two electrical terminals spaced apart and a shear blade between the terminals, two series of devices carried respectively by the carrier-arms and adapted to guide wire portions to the electrical terminals, and means carried by the carrier-arms adapted to conduct an electrical current to the electrical terminals.

8. A tie-welding baling press including a baling chamber, a plurality of arms pivotally supported on opposite sides respectively of the chamber and having each an electrical welder head thereon and also an electrical circuit therefor, the heads being provided with means coöperating to guide and clamp wire portions together in parallel arrangement, means connected with the arms for controlling and swinging the arms into or out of the chamber, and a spring operatively connected with the arms and automatically assisting to swing the arms out of the baling chamber.

9. A tie-welding baling press including a baling chamber, a ram-head movable in the chamber, a plurality of carriers mounted on the chamber to be moved into the chamber and having each an electrical welder head thereon and also a circuit wire leading to the head, means for moving and controlling the arms, gearing operatively connected with the ram-head to move the same, and an electrical circuit-breaker for the circuit wires arranged to be operated and controlled by the gearing.

10. A tie-welding baling press including a baling chamber, curved arms pivotally supported on the opposite outer sides of the chamber for drawing baling wires into the chamber to be connected together, the arms having electrical welder heads coöperating to form loops of the wires, means connected with the arms for synchronously controlling and swinging the arms into the chamber, cutters carried by the arms for severing the wires, and movable means controlled in synchronism with the swinging arms automatically acting on the arms in proximity to the welder heads to force the heads together to form the wire loops.

11. In a tie-welding baling press, the combination of a baling chamber, a plurality of arms pivotally supported to swing each to the other in the chamber, each arm having two electrical terminal portions spaced apart and a shear blade on a plane between said portions, said portions being adapted to hold wire portions in parallel arrangement between them, the shear blades coöperating to sever the wire portions between said terminal portions, means for moving and controlling the arms, and electrical circuits carried by the arms and connected with said terminal portions.

12. In a tie-welding baling press, the combination of a frame and a baling chamber therein, arms movably supported on the frame to be moved into the chamber for drawing baling wires into the chamber to be connected together, the end portions of the arms being adapted to momentarily hold the wires together stationarily, electrical welding implements carried by the arms for welding the wires together, and controlling gearing for the arms.

13. In a tie-welding baling press, the combination of a frame and a baling chamber therein, a rock-shaft horizontally supported under the frame, two gear segments fixedly secured to the rock-shaft, two upright shafts rotatively supported on opposite sides respectively of the frame, two gear segments fixedly secured to the upright shafts respectively in mesh with the two segments respectively that are on the rock-shaft, curved arms fixedly secured to the upright shafts respectively and movable thereby into the baling chamber, electrical welding implements carried by the arms, electrical conducting collars secured to the upright shafts, circuit wires carried by said arms and connected with the welding implements and the collars, electrical brushes mounted on said frame, and electrical circuit wires connected to said brushes.

14. In a tie-welding baling press, the combination of a frame and a baling chamber therein, arms movably supported on the frame to be moved into the chamber for drawing baling wires into the chamber to be welded together, electrical welding implements carried by the arms for welding the wires together, electrical circuit wires stationarily supported on the frame, movable electrical circuit wires mounted on said arms and connected with the welding implements and also with the stationarily-supported circuit wires, and controlling gearing connected with the arms for moving the arms into or out of the chamber with the welding implements and the movable circuit wires thereon.

15. In a tie-welding baling press, the combination of a frame and a baling chamber therein, arms movably supported on the frame to be moved into the chamber for drawing wires into the chamber to be connected together, electrical welding implements carried by the arms for welding the wires together, controlling gearing for the arms, a ram-head movable in the chamber, a drive wheel having a shaft rotatably supported by the frame and having a crank-pin, a pitman connected with the ram-head and the crank-pin, movable connecting means for connecting the controlling gearing of the arms with said shaft, and electrical circuits connected with the welding implements and provided with a circuit breaker controlled by the connecting means, portions of the electrical circuits being carried on the movable arms.

16. In a tie-welding baling press, the combination of a frame and a baling chamber therein, an upright shaft rotatively mounted on the frame adjacent to the chamber, an arm secured to the shaft to be moved into or out of the chamber, an electrical welding implement carried by the arm, a ram-head movable in the chamber, a gear wheel having a shaft rotatably supported by the frame, the wheel having also a crank-pin, a pitman connected with the ram-head and the crank-pin, a segment wheel mounted on the shaft of said gear wheel to be rotated thereby, a pinion rotatably mounted on the frame and having a crank-pin, the pinion being constructed to be intermittently rotated by the segment wheel, a rock-shaft mounted on the frame, a gear segment secured to the rock-shaft and having a rocker-pin thereon, a gear segment secured to the upright shaft and meshing with the first-described gear segment, and a rod connected with the rocker-pin and the crank-pin of said pinion.

17. In a baling press, the combination of a baling chamber, two carrier-arms pivotally supported on the opposite outer sides respectively of the chamber to swing into the chamber, gearing connected with the carrier-arms for moving and controlling them synchronously, two baling wires guided between the carrier-arms and the said sides respectively to be drawn by the carrier-arms each to the other and into the baling chamber to be connected together, tension devices movably supported between the carrier-arms and the adjacent sides of said chamber in contact with said wires respectively, means for actuating the gearing, and means operatively connected with said gearing for automatically drawing the tension devices from between the carrier-arms and said sides synchronously in advance of the inward movement of the carrier-arms.

18. In a baling press, the combination with a baling chamber, of curved arms pivotally supported on the opposite outer sides of the chamber for drawing baling wires from the said sides and into the chamber to be connected together, means connected with the arms for synchronously controlling and swinging the arms into the chamber, cutters carried by the arms for severing the wires, a ram-head movably guided in the chamber, and devices movably controlled in synchronism with the ram-head to engage the curved arms following movement of the arms into the chamber for forcibly drawing the end portions of the arms into juxtaposition to bend and sever the wires.

19. In a baling press, the combination with a frame having a baling chamber, of two pairs of carrier-arms pivotally supported on the frame to swing into the baling chamber, operating and controlling gearing for the carrier-arms supported by the frame, baling wires to be drawn by the carrier-arms into the chamber to be connected together, cross-heads movably mounted and guided on the frame and provided with tension devices for guiding and drawing the wires, intermittent-rotary gearing mounted on the frame, connections operatively connecting the operating and controlling gearing with the intermittent-rotary gearing, and connections operatively connecting the cross-heads with the intermittent-rotary gearing.

20. In a baling press, the combination with a baling chamber, of two carrier-arms pivotally supported on the opposite outer sides respectively of the chamber to swing into the chamber, gearing connected with the carrier-arms for moving and controlling them synchronously to draw baling wires each to the other and into the baling chamber to be connected together, and a ram-head movably guided in the baling chamber and provided with rollers to be carried into contact with the outer sides of the carrier-arms when the latter are moved partially into said chamber, for forcing the carrier-arms farther inward and each to the other.

21. In a baling press, the combination with a baling chamber, of curved arms pivotally supported on the opposite outer sides of the chamber for drawing baling wires into the chamber to be connected together, gearing connected with the arms for synchronously controlling and swinging the arms into the chamber, a ram-head movably guided in the chamber and constructed to receive the arms and the wires and also to start retraction of the arms following connection of the wires together, and means coöperating with the gearing automatically acting to complete the retraction of the arms from the ram-head and the chamber.

22. In a baling press, the combination of a plurality of arms pivotally supported to swing each to the other, one arm having two jaws spaced apart and a shear blade between the jaws, the other one of the arms having a head to enter between the jaws for forming wire loops and provided on its front with a shear blade set to coöperate with the first-described blade for severing one from the other portion of the loops, means for moving and controlling the arms, and electrical means carried by the jaws and the head coöperating to weld the different portions of the two loops together.

23. In a baling press, the combination with a baling chamber, of an upright shaft rotatably supported on the outer side of the chamber, two curved arms fixedly secured to the shaft for drawing two baling wires laterally into the chamber, a cross-head movably guided on the outer side of the chamber in proximity to the arms respectively, and two pairs of tension rollers mounted on the cross-head for guiding the two wires to the arms respectively and drawing the wires in opposition to the arms respectively.

24. In a baling press, the combination with a frame and a baling chamber therein, of a rock-shaft supported horizontally under the frame, two gear segments fixedly secured to opposite end portions respectively of the rock-shaft, one of the segments having a rocker-pin thereon, two upright shafts rotatably supported on opposite sides respectively of the frame, two gear segments fixedly secured to the upright shafts respectively in mesh with the two segments respectively that are on the rock-shaft, two curved arms fixedly secured to one of the upright shafts and movable thereby into one side of the baling chamber, two curved arms fixedly secured to the remaining one of the upright shafts and movable thereby into the opposite side of the baling chamber, welding implements carried by the arms, an intermittent-rotary pinion mounted on the frame and having a crank-pin, a rod connected with the rocker-pin and the crank-pin, means for intermittently rotating the pinion, and means for stopping the pinion following each rotary movement thereof.

25. In a baling press, the combination with a frame and a baling chamber therein, of carrier-arms pivotally supported on the frame and movable into the chamber for drawing wires into the chamber to be connected together, a ram-head movable in the chamber to form bales, a gear wheel having a shaft rotatably supported by the frame, the wheel having also a crank-pin, a pitman connected with the ram-head and the crank-pin, a crank-wheel rotatably mounted on the shaft and having a crank-pin, tension devices for the wires movably mounted on the frame and operatively connected with the last-described-crank-pin, and means for intermittently connecting and disconnecting the crank-wheel to or from the shaft.

26. In a baling press, the combination of a frame and a baling chamber therein, a pair of arms pivotally supported on the frame to be moved into the chamber for drawing baling wires into the chamber to be connected together, welding implements carried by the arms for welding the wires together, controlling gearing for the arms, a ram-head movable in the chamber, tension devices movably guided on the frame for guiding and also tightening the wires on being drawn into the chamber, a drive wheel having a shaft rotatably supported by the frame and having a crank-pin, a pitman connected with the ram-head and the crank-pin, an intermittent-rotary segment wheel rotatably mounted on the shaft of the drive wheel and having a crank-pin, a pull-bar movably connected to the segment wheel and having a lug thereon, a crank-arm fixedly secured to the shaft and having a projection for engaging the lug to turn the segment wheel, means for connecting the controlling gearing with the segment wheel, a pinion rotatably supported by the frame below the segment wheel and constructed to be intermittently rotated by the segment wheel, means for connecting the guides of the tension devices with the pinion, and a stop-bar mounted on the frame and projectable into the path of movement of the pull-bar for disconnecting the lug from the projection.

27. In a tie-welding baling press, the combination of a baling chamber, means in the chamber for guiding a banding wire, movable means coöperating with the structure of the chamber to draw portions of the wire together in parallel arrangement, said means being adapted for guiding and holding the wire portions in parallel arrangement, and electrical welding instruments carried by the movable means.

28. In a tie-welding baling press, the combination of a baling chamber, wire-controlling means coöperating with the structure of the baling chamber to engage and hold portions of a banding wire side-by-side in resting position, electrical welding instruments mounted on the wire-controlling means, and means adapted to conduct an electrical current along the wire-controlling means to the electrical welding instruments.

29. In a tie-welding baling press, the combination of a baling chamber, wire-controlling means coöperating with the structure of the baling chamber to engage and hold portions of a banding wire side-by-side in resting position, electrical welding instruments controlled in synchronism with the wire-controlling means and coöperating therewith to electrically unite the wire portions when in said position, and means controlled synchronously with the electrical welding instruments for severing the electrically united portions of the wire.

In testimony whereof I affix my signature in presence of two witnesses.

LEWIS B. WYGANT.

Witnesses:
MAUDE ELDER,
A. M. WILLOUGHBY.